No. 722,539. PATENTED MAR. 10, 1903.
K. RUSHTON.
VENTILATOR FOR CABS OF LOCOMOTIVES.
APPLICATION FILED SEPT. 11, 1901.
NO MODEL.
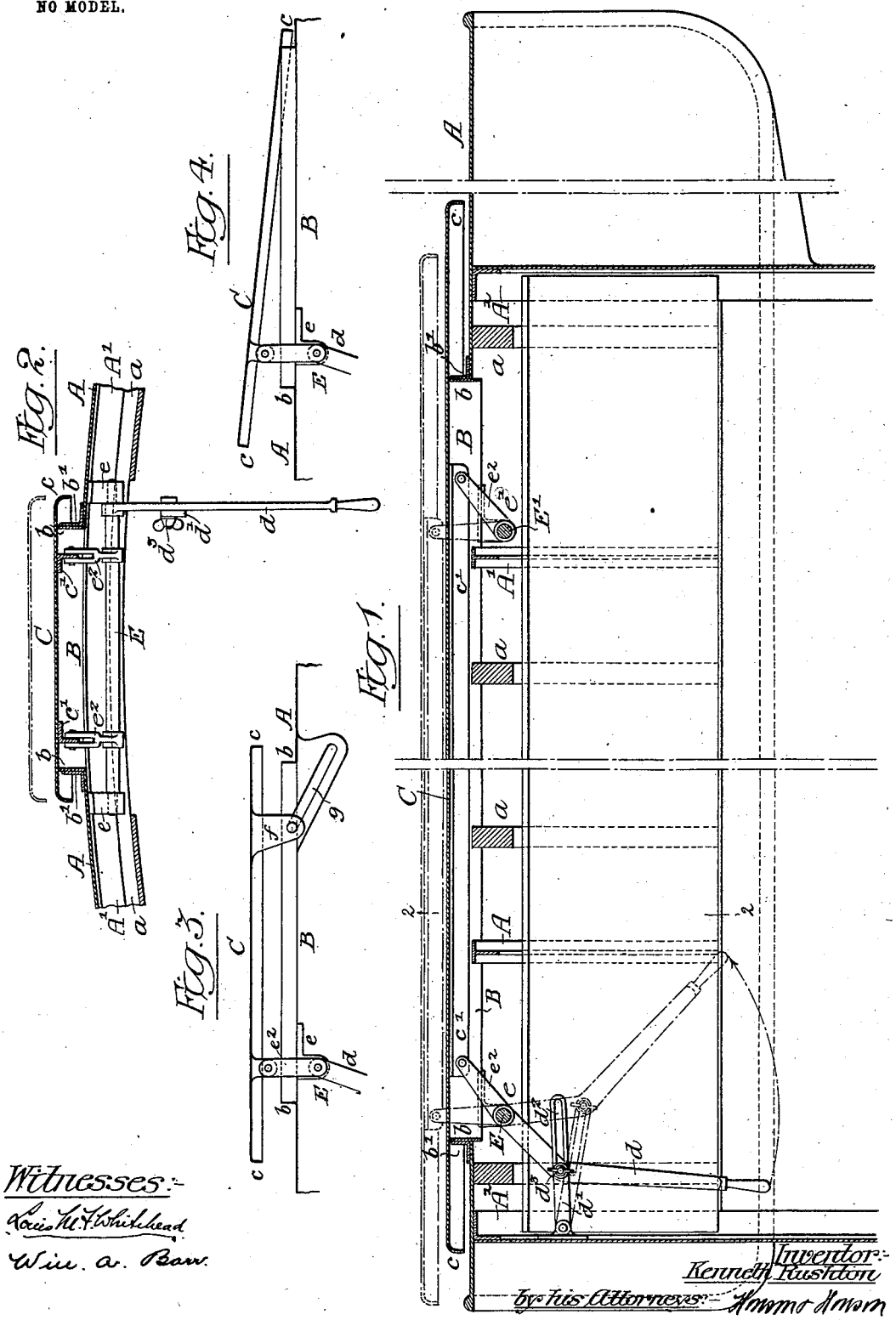

UNITED STATES PATENT OFFICE.

KENNETH RUSHTON, OF PHILADELPHIA, PENNSYLVANIA, ASSIGNOR TO BURNHAM, WILLIAMS & COMPANY, OF PHILADELPHIA, PENNSYLVANIA, A FIRM.

VENTILATOR FOR CABS OF LOCOMOTIVES.

SPECIFICATION forming part of Letters Patent No. 722,539, dated March 10, 1903.

Application filed September 11, 1901. Serial No. 75,035. (No model.)

*To all whom it may concern:*

Be it known that I, KENNETH RUSHTON, a citizen of the United States, residing in Philadelphia, Pennsylvania, have invented certain Improvements in Ventilators for Cabs of Locomotives, &c., of which the following is a specification.

My invention relates to certain improvements in means for ventilating the cabs of locomotives, and has for its object the provision of a device which will procure a large area of ventilation with but a slight change in the position of the ventilator. This object I attain in the following manner, reference being had to the accompanying drawings, in which—

Figure 1 is a sectional elevation of a cab of a locomotive to illustrate my invention. Fig. 2 is a transverse sectional view on the line 2 2, Fig. 1. Figs. 3 and 4 are views of modifications of my invention.

It will be understood that while I have described my invention in connection with the roof of a cab of a locomotive it may be used in connection with a roof of a car or any other roof where the space is limited.

A is the roof of a cab of a locomotive, constructed in the present instance of T-irons A' and angle-irons $A^2$, and between these irons are wooden beams $a$, which serve to support the wooden sheeting of the cab. The roof in the present instance is made of metal and has a ventilating-opening B, the edges of the opening being reinforced with a plate $b$, secured to the roof by angle-irons $b'$, and this plate forms an upwardly-projecting flange around all four of the sides of the opening.

C is a movable roof-section, which completely covers the opening in the roof, and it is of such a size that its edges extend on all sides a considerable distance beyond the upwardly-projecting flanged plate $b$, said edges being turned down in order to form a depending flange $c$.

The above-described construction is such as to form a water and wind tight joint, which will effectually prevent moisture from entering the cab under the movable roof-section.

Fixed to the inside of the roof of the cab are bearings $e$ for transverse shafts E E', as shown in Fig. 2, and keyed or otherwise fixed to each shaft are arms $e^2$, which are in the present instance pivotally connected to the angle-irons $c'$, riveted to the under side of the roof-section C. These angle-irons preferably extend to nearly the full length of the roof-section, so as to stiffen the said section. On the shaft E is an operating-lever $d$, on moving which the movable roof-section can be raised or lowered.

In order to lock the movable roof-section in its adjusted position, I pivot a slotted arm $d'$ to the body of the cab and provide the operating-lever $d$ with a bolt $d^3$, which passes through the slot in the arm $d'$, said bolt having a wing-nut by which the operating-arm can be held in any position desired.

It will be seen that when it is desired to ventilate the cab all that is necessary is to move the operating-lever to the position shown by dotted lines, Fig. 1, and as the lever is moved it will elevate the movable roof-section to the position above indicated, the action being similar to that of a parallel rule.

By applying the above-described combination of levers to the movable roof-section of a cab I am enabled to secure a maximum area of ventilation with a minimum movement of said roof-section, the device for accomplishing this result being easily and quickly operated.

In Fig. 3 I have shown a modification of my invention, in which a single operating-shaft is used to raise the movable roof-section C, the opposite end of the said section having depending lugs $f$, which carry pins arranged to travel in inclined slots $g$ in pieces secured to the permanent roof.

In Fig. 4 I have shown one end of the movable roof-section arranged to slide on the permanent roof, the other end of the roof-section being connected to elevating means, so that only one end of the movable roof-section is raised.

While I have shown in Fig. 1 the movable roof-section arranged to move parallel with the fixed portion of the roof, it should be understood that it may be elevated to any angle desired, according to the length of the arms.

I claim as my invention—

1. The combination of a cab or car roof having an opening therein and having a flange around said opening, a movable roof-section having a depending flange, shafts mounted in bearings on the cab-roof, arms on said shafts pivoted to the movable roof-section, an operating-arm on one of said shafts, a slotted arm pivoted to the cab, and a wing-nut arranged to lock the operating-arm to the slotted arm, substantially as described.

2. The combination of a cab or car roof having an opening therein and having an upwardly-projecting flange surrounding said opening, a movable roof-section considerably larger than the opening in the roof of the cab provided with a downwardly-projecting flange, longitudinal irons secured to the under side of the roof-section, a plurality of shafts, arms on each shaft pivoted to the said irons, a lever on one of the shafts, a bar pivoted to the cab and means for locking the lever to said bar so that the movable section can be held in any desired position, substantially as described.

In testimony whereof I have signed my name to this specification in the presence of two subscribing witnesses.

KENNETH RUSHTON.

Witnesses:
 JAS. H. M. HAYES,
 WILLIAM DE KRAFFT.